United States Patent
Huang et al.

(10) Patent No.: US 12,205,339 B2
(45) Date of Patent: Jan. 21, 2025

(54) METHOD FOR DETECTING SEALED OR UNSEALED STATE OF PRE-DETECTED CLIP APPEARING IN IMAGE OF BOXED PRODUCTS, ELECTRONIC DEVICE USING METHOD, AND NON-TRANSITORY STORAGE MEDIUM

(71) Applicant: HON HAI PRECISION INDUSTRY CO., LTD., New Taipei (TW)

(72) Inventors: Ying-Tien Huang, New Taipei (TW); Yu-Ting Chou, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 379 days.

(21) Appl. No.: 17/941,178

(22) Filed: Sep. 9, 2022

(65) Prior Publication Data
US 2023/0078261 A1   Mar. 16, 2023

(30) Foreign Application Priority Data
Sep. 16, 2021   (CN) .......................... 202111089144.5

(51) Int. Cl.
*G06K 9/00*   (2022.01)
*G06T 7/194*   (2017.01)
(Continued)

(52) U.S. Cl.
CPC .............. *G06V 10/25* (2022.01); *G06T 7/194* (2017.01); *G06T 7/70* (2017.01); *G06V 10/36* (2022.01);
(Continued)

(58) Field of Classification Search
CPC ........ G06V 10/25; G06V 10/36; G06V 10/60; G06V 10/771; G06V 2201/07;
(Continued)

(56) References Cited

U.S. PATENT DOCUMENTS

| | | | |
|---|---|---|---|
| 9,715,723 B2 * | 7/2017 | Shlain | G06V 10/764 |
| 11,699,240 B2 * | 7/2023 | Liu | G06T 7/70 |
| | | | 382/103 |

(Continued)

FOREIGN PATENT DOCUMENTS

| | | | |
|---|---|---|---|
| EP | 3866113 A1 * | 8/2021 | |
| KR | 20080013077 A * | 2/2008 | |

OTHER PUBLICATIONS

A Comparative Study of Machine Vision Classification Techniques for the Detection of Missing Clips, Brandon Miles, 2009, Pages (Year: 2009).*

(Continued)

*Primary Examiner* — Jayesh A Patel
(74) *Attorney, Agent, or Firm* — ScienBiziP, P.C.

(57) ABSTRACT

A method for detecting from images correct placement and function, or incorrect placement and function, of a clip of a transportation box of wafers in sterile or similar conditions obtains an image template comprising features of clip and obtains a first detection image of a working clip. An object region focusing on the imaged clip in the first detection image is determined according to the image template. Part of the working image is selected as a first preset location. The part of the image is masked to obtain a second detection image, the masking obscures the background region of the part of the image but not the clip-object region, and displays the unobscured clip-object region. The second detection image is input into a trained neural network model to determine whether the clip is in sealed or unsealed state. An electronic device and a non-transitory storage medium are also disclosed.

20 Claims, 14 Drawing Sheets

(51) Int. Cl.
  *G06T 7/70* (2017.01)
  *G06V 10/25* (2022.01)
  *G06V 10/36* (2022.01)
  *G06V 10/60* (2022.01)
  *G06V 10/771* (2022.01)

(52) U.S. Cl.
  CPC ............ *G06V 10/60* (2022.01); *G06V 10/771* (2022.01); *G06T 2207/20081* (2013.01); *G06T 2207/20084* (2013.01); *G06V 2201/07* (2022.01)

(58) Field of Classification Search
  CPC . G06T 7/194; G06T 7/70; G06T 2207/20081; G06T 2207/20084
  See application file for complete search history.

(56) References Cited

U.S. PATENT DOCUMENTS

| | | | | |
|---|---|---|---|---|
| 2016/0253579 A1* | 9/2016 | Bamba | ............... | G06T 11/00 382/103 |
| 2016/0379351 A1* | 12/2016 | Michael | ............... | G06T 7/001 348/46 |
| 2017/0287137 A1* | 10/2017 | Lin | ............... | G06V 10/454 |
| 2018/0164792 A1* | 6/2018 | Lin | ............... | G05B 19/41875 |
| 2019/0073566 A1* | 3/2019 | Brauer | ............... | G06V 10/776 |
| 2021/0097277 A1* | 4/2021 | Hirai | ............... | G06N 3/08 |
| 2021/0217179 A1* | 7/2021 | Li | ............... | G06T 7/11 |
| 2021/0366127 A1* | 11/2021 | Gu | ............... | G06T 7/11 |
| 2022/0292291 A1* | 9/2022 | Berman | ............... | G06F 18/285 |
| 2022/0292685 A1* | 9/2022 | Heisler | ............... | G06T 7/11 |
| 2023/0206414 A1* | 6/2023 | Chen | ............... | G01N 23/04 382/100 |

OTHER PUBLICATIONS

Fuzzy Clip Detection Using Sugeno Model, P. Mehran, K.Demirli et al., IEEE, 2006, pp. 720-725 (Year: 2006).*

Machine Vision System for Counting Small Metal Parts in Electro-Deposition Industry, Rocco Furferi et al., MDPI, 2019, pp. 1-14 (Year: 2019).*

Robust Fastener Detection for Autonomous Visual Railway Track Inspection, Xavier Gibert et al., IEEE, 2015, pp. 694-701 (Year: 2015).*

High-Speed Railway Fastener Detection Based on a Line Local Binary Pattern, Hong Fan et al., IEEE, 2018, pp. 788-792 (Year: 2018).*

A Rail Fastener Tightness Detection Approach Using Multi-source Visual Sensor, Qiang Han et al., MDPI, 2020, pp. 1-22 (Year: 2020).*

Han, Qiang, et al. "A rail fastener tightness detection approach using multi-source visual sensor." Sensors 20.5 (2020): 1367. (Mar. 2, 2020).

* cited by examiner

METHOD FOR DETECTING SEALED OR UNSEALED STATE OF PRE-DETECTED CLIP APPEARING IN IMAGE OF BOXED PRODUCTS, ELECTRONIC DEVICE USING METHOD, AND NON-TRANSITORY STORAGE MEDIUM

FIELD

The subject matter herein generally relates to clip detection in manufacturing process, and particularly to a method for detecting a clip, an electronic device using the method, and a non-transitory storage medium.

BACKGROUND

Clips can be used to fix and seal containers and operators can manually detect whether the clips are in place to determine whether the clips are sealed. For example, during wafer production, the wafers can be received in transmission boxes, and clips can be fixed on transmission boxes to lock and seal the transmission boxes. However, the latch or switch of a clip is small, or a color of the latch or the switch may be hard to see, and an error may be made by an operator when checking a clip by eye.

An artificial Intelligence (hereinafter AI) model can be employed to detect whether the clips are in place and are functioning, a detection cost can be accordingly lower, and a detection accuracy can be accordingly improved. However, a fixture which gives assistance to a position of the clip does not have a close tolerance, and there may be a positioning error in the arrangement of the clip, the clip may be in the wrong position by a large distance. When a clip is out of position by a large margin, the clip may be outside of a first preset location of an image, and the AI model may indicate an incorrect result. Thus, when a result of the AI detection is incorrect, it may be an error of the AI model or may be the result of the clip simply being out of an effective location. Moreover, the distributions in the first preset location of the image include not only the clip, but also the background region, for example, objects around the clip. Thus, the background region may contribute to an incorrect detection.

SUMMARY

An embodiment of the present application provides a method for detecting clip integrity, an electronic device using the method, and a non-transitory storage medium. The method can determine a desired region to analyze in the first detection image (for example, clip), and can mask the background region of the desired region for an improved ability in recognizing the clip either as being in its proper place and functioning properly or as not being in its proper place and functioning properly An embodiment of the present application provides a method for detecting state of a clip in images of a working clip ("imaged clip"). The method detecting the state of a clip is applied on a device. The method obtains an image template including features of clip. The method obtains a first detection image of the clip. The method determines an object region which is the imaged clip in the first detection image according to the image template. The method selects a part of an image which is a first preset location of the first detection image. The imaged clip appears in the part of the image. The method masks the part of the image to obtain a second detection image of the clip which again includes the imaged clip. The masking hides and obscures the background region rather than the object region in the part of the image, and displays the object region. The method inputs the second detection image of the clip into a trained neural network model to determine whether the clip is in place and is functioning (hereinafter, "sealed clip" indicates an imaged clip which is found to be in place and is functioning, "unsealed clip" indicates an imaged clip which is not in place or is not functioning). The trained neural network model is the neural network model which has been trained via inputting training images which are masked into the neural network model. In the training images, the state of the imaged clips comprise a sealed-state and an unsealed-state. "sealed-state" or "unsealed-state" signifies the states of the clips as above.

According to some embodiments of the present application, the obtaining of an image template including features of clip includes, obtaining a standard image of the clip and selecting a second preset location of the standard image to be qualified as an image template. The imaged clip is located in the second preset location in the standard image. A size of the second preset location is smaller than a size of the first preset location.

According to some embodiments of the present application, the determining of an object region which is the imaged clip in the first detection image according to the image template comprises the performing of a feature matching process on the first detection image according to the image template and determining the object region which enclose the imaged clip in the first detection image if the feature matching is successful. The feature matching is successful if a position of the imaged clip is within the first preset location of the first detection image.

According to some embodiments of the present application, the method further adjusts a position of a camera of the device if the feature matching fails and controls the camera to capture another first detection image until the feature matching is successful. The feature matching fails if the position of the imaged clip is out of the first preset location of the first detection image.

According to some embodiments of the present application, before masking part of the image to obtain a second detection image of the clip, the method further pre-processes the part of the image to improve a contrast of the part of the image. The pre-processing includes at least one from a group consisting of: Histogram Equalization, Histogram Stretching, Laplace Operator, log transformation, Gamma transformation.

According to some embodiments of the present application, before masking the part of the image to obtain a second detection image of the clip, the method further controls a light strength and a position of a light source of the device to reduce interference by ambient light.

According to some embodiments of the present application, images in which the position of the imaged clips are out of the first preset locations of the images are filtered out from the training images.

An embodiment of the present application also provides a device for detecting state of a clip. The device for detecting clip includes a storage device, and at least one processor. The storage device stores one or more programs, which when executed by the at least one processor, cause the at least one processor to obtain an image template comprising features of clip. The at least one processor obtains a first detection image of the clip. The at least one processor determines an object region which is the clip in the first detection image according to the image template. The at least one processor selects a part of the image which is a first preset location of the first detection image. The imaged clip is distributed in the part of the image. The at least one processor further masks the part of the image to obtain a second detection image of the clip. The masking obscures the background region in the part of the image rather than the object region, and displays an unobscured object region. The at least one processor further inputs the second detection image of the clip into a trained neural network model to determine whether the clip is sealed-state or unsealed-state. The trained neural network model is the neural network model which has been trained via inputting training images which are masked into the neural network model. In the training images, the states of the clips includes a sealed-state and an unsealed-state.

An embodiment of the present application also provides a non-transitory storage unit. The non-transitory storage medium stores a set of commands, the commands being executed by at least one processor of an electronic device enable the at least one processor to obtain an image template comprising features of clip. The at least one processor obtains a first detection image of the clip. The at least one processor determines an object region which is the imaged clip in the first detection image according to the image template. The at least one processor selects a part of the image which is a first preset location of the first detection image. The imaged clip is distributed in the part of the image. The at least one processor further masks the part of the image to obtain a second detection image of the clip. The masking hides and obscures the background region in the part of the image rather than the object region, and displays the object region. The at least one processor further inputs the second detection image of the clip into a trained neural network model to determine whether the clip is correct in state or incorrect in state. The trained neural network model is the neural network model which has been trained via inputting training images which are masked into the neural network model. In the training images, the states of the clips includes a sealed-state and an-unsealed state.

A method, a device, and a storage medium capable of determining a desired region for recognition purposes in the first detection image (for example the clip), and masking the background region rather than the desired region are disclosed. The region needed for identifying sealed-state or unsealed-state in relation to the imaged clip can remain, and the quantity of pixels of the second detection image inputted into the trained neural network model can be reduced. The number of the parameters of the neural network model can be reduced, and interference arising from the background region can be avoided, detection speed and accuracy can thus be improved.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

In addition, it should be understood that in the description of this application, terms such as "first" and "second" are used only for distinguishing in the description, but are not intended to indicate or imply relative importance or an order. The terms "exemplary" and/or "example" are used herein to mean "serving as an example, instance, or illustration." Any embodiment described herein as "exemplary" and/or "example" is not necessarily to be construed as preferred or advantageous over other embodiments. A feature limited by "first", "second" may expressly or implicitly include at least one of the features. Use of the word exemplary is intended to present concepts and techniques in a concrete fashion.

It should be noted that the steps shown in the flowchart of method can be performed by computer executable instructions in a computer system. In addition, although a logical sequence is shown in the flowchart, in some circumstance, the shown or described steps may be performed in a sequence different from the sequence described herein.

A method for detecting whether an imaged clip is in place and is functioning properly ("sealed clip") via an AI model can include:

(1) obtaining images of clips, and classifying the images according to states of the clips, for example sealed or unsealed.

(2) selecting a part of an image of a first preset location from the image of the clip to be a training image of the AI model.

(3) inputting the training images into the AI model to train the AI model, and detecting whether the state of the clip is sealed or unsealed via the trained AI model.

Figure 1:
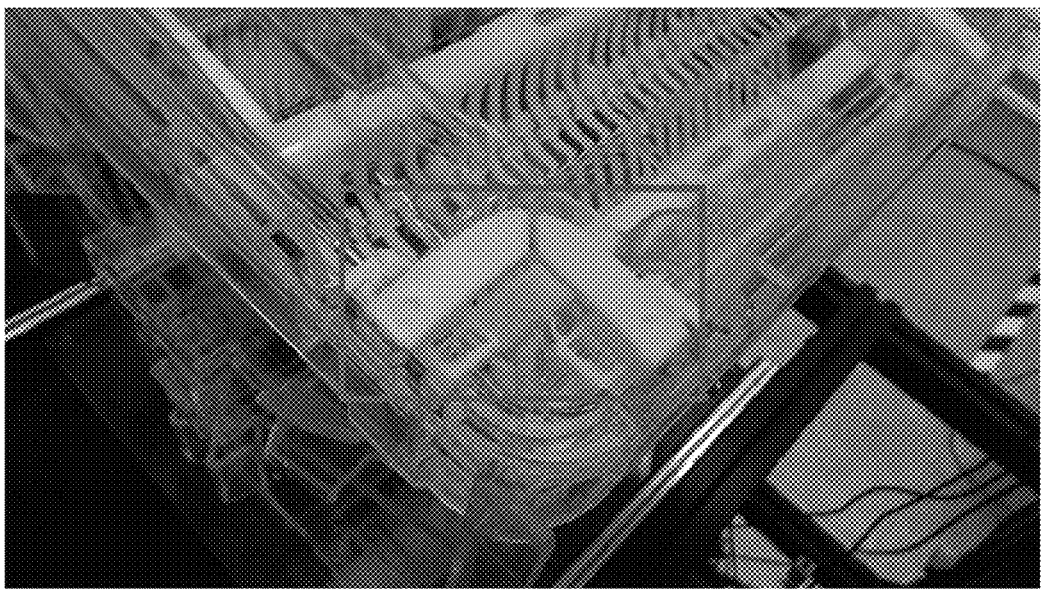
FIG. 1 is a schematic view of an embodiment of a clip.

The AI model can be a neural network model. During detection of the clip, usually a target position (for example a latch or a switch) of the imaged clip needs to be detected to determine the state of the imaged clip. For example, during detection, the first preset location which is marked via a rectangle in FIG. 1 can be detected. It can be understood that, the first preset location can be a fixed position; during detection via the neural network model, the method can select a part of image of a first preset location in each image, and then classify the part of the images of the first preset locations according to states of the clips. The classification can be made, for example during detection, according to the state of the latch (for example a sealed state and an unsealed state).

For a positional error of the clip, or a tolerance of the fixture which is used to provide placement of the clip, the position of the imaged clip in the image may be distanced, for example, the imaged clip is out of the first preset location in the image. Moreover the images of the clips can be easily influenced by the ambient light or by appearance of the environmental objects. When an imaged clip is out of position, or the part of the image includes background region of the imaged clip (for example the objects around the clip), the detection by the neural network model may be erroneous. The error can be lower via employing more training images and more kinds of the training images to train the neural network model. However, with greater number of training images, during training, the number of parameters of the neural network model may be increased, an overfitting problem may be created, and a training cost of the neural network model may be increased.

An embodiment of the present disclosure provides a method for detecting a clip in an image ("imaged clip"), a device employing the method for detection in relation to the imaged clip (hereinafter detection device), and a non-transitory storage medium. In a first detection image, if the imaged clip is out of the first preset location of the first detection image, a position of a camera of the detection device can be adjusted to obtain another first detection image of the clip in which the imaged clip will be within the first preset location of the first detection image. A feature matching can be performed to determine the position of the imaged clip in the first detection image. By determining the position of the imaged clip in the first detection image, the first detection image in which the position of the imaged clip is out of position can be filtered. According to the determination of the position of the imaged clip in the first detection image, the first detection image can be masked to obtain a second detection image of the clip. Thus, the background region of the imaged clip in the first detection image can be filtered, and the influence of objects around the imaged clip can be reduced. Moreover, the quantity of pixels of the second detection image input into the neural network model can be reduced, thus the number of the parameters of a neural network model can be reduced, and a detection accuracy of the neural network model can be improved.

Figure 2:
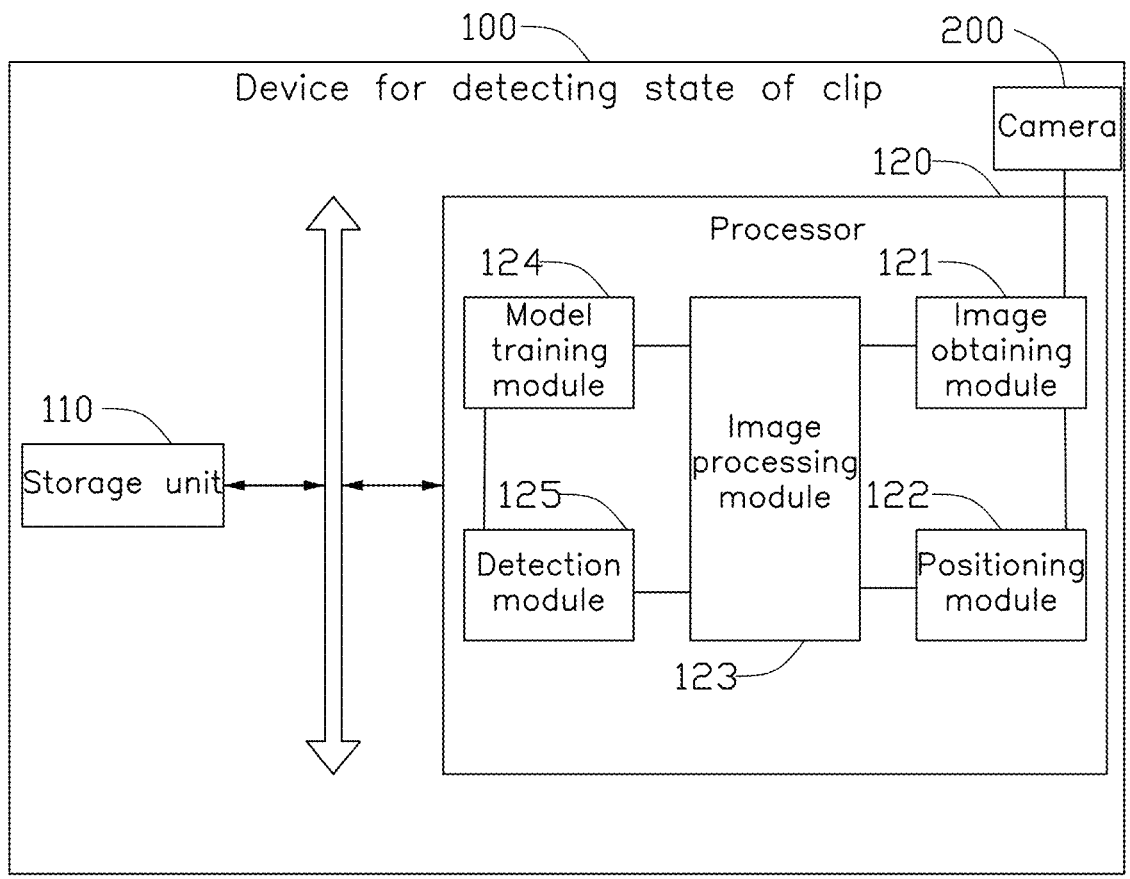
FIG. 2 is a block diagram of an embodiment of a device for detecting state of clip.

FIG. 2 is a block diagram of an embodiment of a device employing the method for detection in relation to the imaged clip (hereinafter detection device).

Referring to the FIG. 2, the detection device 100 includes a storage unit 110 and a processor 120. The storage unit 110 is configured to store one or more programs. The processor 120 can execute the one or more programs stored in the storage unit 110 to accomplish the function of the detection device 100.

The storage unit 110 can include transitory storage medium, or non-transitory storage medium, such as Digital Versatile Disc, or the other optical disk, hard disk, memory, smart media card, secure digital, flash card, or other non-transitory storage medium.

The processor 120 can include, but is not limited to, one or more central processing units, digital signal processors, application specific integrated circuits, field-programmable gate arrays, or other programmable logic devices, discrete gate or transistor logic, discrete hardware components, and so on.

In at least one embodiment, the processor 120 can communicate with the camera 200. The camera 200 can be configured to capture an image of the clip, and transmit the image of the clip to the processor 120. The processor 120 can adjust a position of the camera 200 via a first instruction.

In at least one embodiment, the communication between the processor 120 and the camera 200 can be wireless communication or a wired communication. The wired communication can be communication via a wired transmission medium (for example an optical fiber, a copper wire, or the like). The wireless communication can be communication via a wireless transmission medium (for example WI-FI, BLUETOOTH, 2G/3G/4G/5G, or other cellular network).

It can be understood that, in at least one embodiment, the camera 200 can be an external component independent of the detection device 100, the disclosure is not limited herein.

The processor 120 can include an image obtaining module 121, a positioning module 122, an image processing module 123, a model training module 124, and a detection module 125. The image obtaining module 121 is communicationally coupled to the camera 200, to obtain the image of the clip captured by the camera 200.

In at least one embodiment, the image obtaining module 121 can be configured to obtain an image template. The image template includes features of the clip. The image obtaining module 121 can be further configured to obtain a first detection image of the clip from the camera 200. The image obtaining module 121 can be further configured to obtain a number of first training images. In the first training images, the states of the clips include sealed-state and unsealed-state.

In at least one embodiment, the positioning module 122 can be coupled to the image obtaining module 121 and the image processing module 123. The positioning module 122 can receive the image template and the first detection image from the image obtaining module 121. The positioning module 122 can be configured to extract the features of the imaged clip from the first detection image according to the image template, and determine an object region which encloses the imaged clip in the first detection image according to the features of the imaged clip.

In at least one embodiment, the positioning module 122 can further receive the first training images from the image obtaining module 121. The positioning module 122 can be configured to extract the features of the imaged clips from the first training images according to the image template, and determine object regions which enclose the imaged clips in the first training images according to the features of the clips.

In at least one embodiment, the positioning module 122 can be configured to perform a feature matching on the first detection image according to the image template. If the feature matching is successful, the positioning module 122 determines the object region which enclosed the imaged clip in the first detection image. If the feature matching fails, the positioning module 122 determines that the clip shown in the image is out of position. Thus, the position of the camera 200 needs to be adjusted, causing the imaged clip to be displayed in the first preset location of another first detection image captured by the adjusted camera 200.

In at least one embodiment, the positioning module 122 can be configured to perform feature matchings on the first training images according to the image template. If the feature matching is successful, the positioning module 122 determines the object region which show the clip in the first training image. If the feature matching fails, the positioning module 122 determines that the position of the imaged clip is out of position, and the first training image cannot be used to train the neural network model. Thus, some first training images can be filtered out.

In at least one embodiment, the positioning module 122 can perform feature matching via template matching, scale-invariant feature transform, oriented fast and rotated brief, or speeded up robust features.

In at least one embodiment, the image processing module 123 can be coupled to the image obtaining module 121, the positioning module 122, the model training module 124, and the detection module 125. The image processing module 123 can receive the first detection image from the image obtaining module 121, and the object region of the first detection image from the positioning module 122. The image processing module 123 can select a part of an image which is the first preset location in the first detection image to mask, to obtain a second detection image. Masking can obscure the background region rather than the object region, and display the object region unobscured.

In at least one embodiment, the image processing module 123 can be further configured to receive the first training images from the image obtaining module 121 and the object regions of the first training images from the positioning module 122. The image processing module 123 can select part of the images to mask, to obtain second training images.

In at least one embodiment, before masking, the image processing module 123 can be configured to pre-process the first detection image or the first training images, to improve the contrast of the first detection image or the first training images. The pre-processing can be, but is not limited to, Histogram Equalization, Histogram Stretching, Laplace Operator, log transformation, Gamma transformation, or the like.

It can be understood that, the positioning module 122 can further select the part of the image which is the first preset location in the first detection image, and transmit the part of the image to the image processing module 123, thus the image processing module 123 can mask the part of the image according to the object region to obtain the second detection image, the disclosure is not limited.

It can be understood that, the positioning module 122 can further select the part of the images which are the first preset location in the first training images, and transmit the part of the images to the image processing module 123, thus the image processing module 123 can mask the part of the images according to the object regions to obtain the second training images, the disclosure is not limited.

In at least one embodiment, the model training module 124 is coupled to the image processing module 123. The model training module 124 can receive the second training images from the image processing module 123. The model training module 124 can be configured to input the second training images into the neural network model to train the neural network model. The neural network model can include, but is not limited to, Convolutional Neural Networks model, Recurrent Neural Network model, Long-Short Term Memory model, Gated Recurrent Unit model, or the like.

In at least one embodiment, the detection module 125 is coupled to the image processing module 123 and the model training module 124. The detection module 125 can receive the second detection image from the image processing module 123 and receive the trained neural network model from the model training module 124. The detection module 125 can be configured to input the second detection image into the trained neural network model to determine the state of the imaged clip.

It can be understood that, each of the functional components/units disclosed above (for example the image obtaining module 121, the positioning module 122, the image processing module 123, the model training module 124, and the detection module 125) may be implemented as software, firmware, hardware, or suitable combinations thereof.

In a hardware implementation, the division of functional components/units mentioned in the foregoing description may not necessarily correspond to the division of physical components. For example, one physical component may have multiple functions, or one function or step may be performed by several physical components in cooperation. Some or all of the physical components may be implemented as software executed by the processor 120 such as a central processing unit (CPU), a digital signal processor (DSP), a field programmable gate array (FPGA) or a microprocessor (MCU), or implemented as hardware, or implemented as an integrated circuit such as an application specific integrated circuit (ASIC).

Such software may be distributed on a computer readable storage medium, which may include a computer storage medium (or non-transitory computer readable storage medium) or a communication medium (or a transitory medium). "Computer storage medium" includes a volatile or nonvolatile, removable or non-removable medium implemented by any method or technology for storage of information (such as computer readable instructions, data structures, program modules or other data), as is well known to one of ordinary skill in the art. The computer storage medium includes, but is not limited to, RAM, ROM, EEPROM, flash memory or other memory technology, CD-ROM, digital versatile disk (DVD) or other optical disk storage, magnetic cassette, magnetic tape, magnetic disk storage or other magnetic storage device, or any other medium which can be used for storing the desired information and which can be accessed by a computer. In addition, the communication medium generally includes computer readable instructions, data structures, program modules or other data in a modulated data signal such as a carrier wave or other transport mechanism, and may include any information delivery medium, as is well known to one of ordinary skill in the art.

Figure 3A:
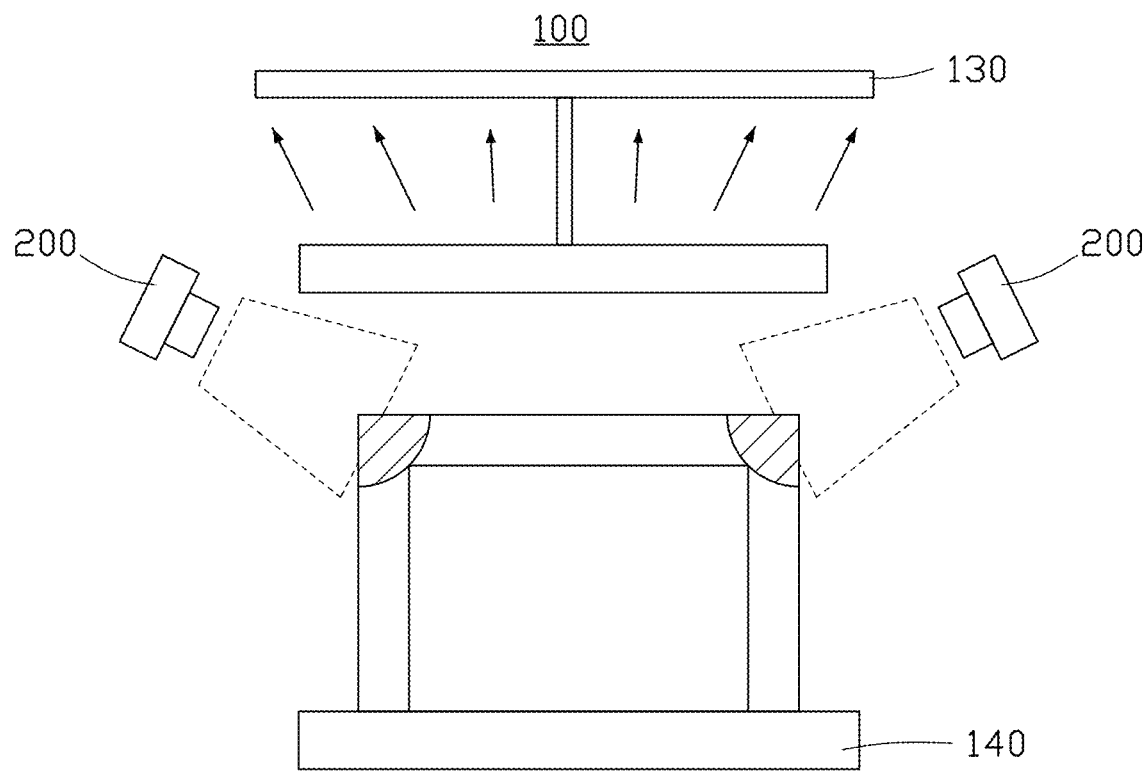
FIGS. 3A-3C are schematic views of an embodiment of the device of FIG. 2.
Figure 3B:
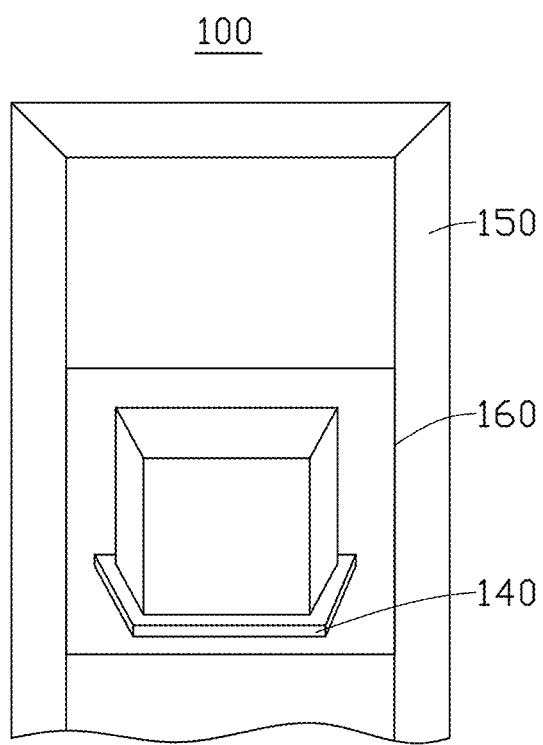
Figure 3C:
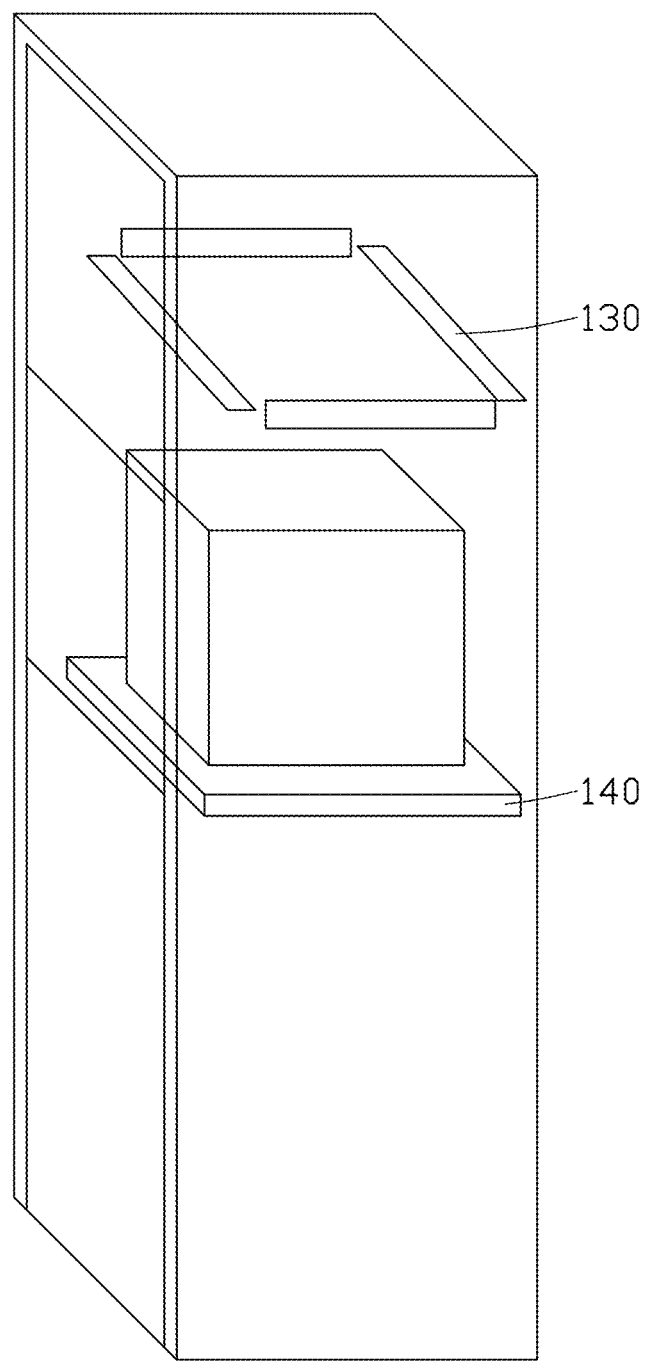

Referring also to FIGS. 3A-3C, FIG. 3A shows a sectioned (interior) view of the detection device, FIG. 3B shows an external view of the detection device, FIG. 3C shows a perspective view of the detection device. The detection device 100 includes the storage unit 110, the processor 120, the camera 200, a light source 130, a fixture 140, a shielding member 150, and an opening 160. The processor 120 is communicationally coupled to the camera 200, the light source 130, and the fixture 140.

The light source 130 is configured to illuminate the clip, to reduce effect of ambient light. The light source 130 can include a thermal radiation source, a gas discharge light source, an electroluminescent light source, or the like. The processor 120 can adjust a light strength and a position of the light source 130 according to a second instruction. As shown in the FIG. 3C, in the interior of the detection device 100, the light source 130 can be employed to illuminate the clip. When the camera captures an image of the clip, the light strength and the position of the light source 130 can be adjusted, the light source 130 can provide an exposure to reduce problems of the image, for example shadow, uneven brightness, and so on. Therefore, the light source 130 can reduce interference by the ambient light. In at least one embodiment, the number of the light sources 130 can be one or more.

The fixture 140 can be configured to provide precise placement of the clip. The processor 120 can adjust the position of the fixture 140 according to a third instruction.

The shielding member 150 can be a shielding plate, a shielding cloth, a shielding paper, or the like. The shielding member 150 is arranged on an outer surface of the detection device 100 to reduce the interference by the ambient light. As shown in the FIG. 3B, the shielding member 150 covers the outer surface of the detection device 100 rather than the opening 160. As in the FIG. 3B, the shielding member 150 can shield against ambient light, thus the interference by the ambient light can be reduced.

The opening 160 is configured to provide a passage for the clip to enter into the detection device 100 or can be an exit path out from the detection device 100. The clip can enter into the interior of the detection device 100 via the opening 160. Thus, the camera can capture the image of the clip, the processor 120 can process the image to determine the state of the clip.

In at least one embodiment, the processing of the image by the processor 120 can refer to each of the modules disclosed above (for example the image obtaining module 121, the positioning module 122, the image processing module 123, the model training module 124, and the detection module 125), and details are not described herein again.

Figure 4:
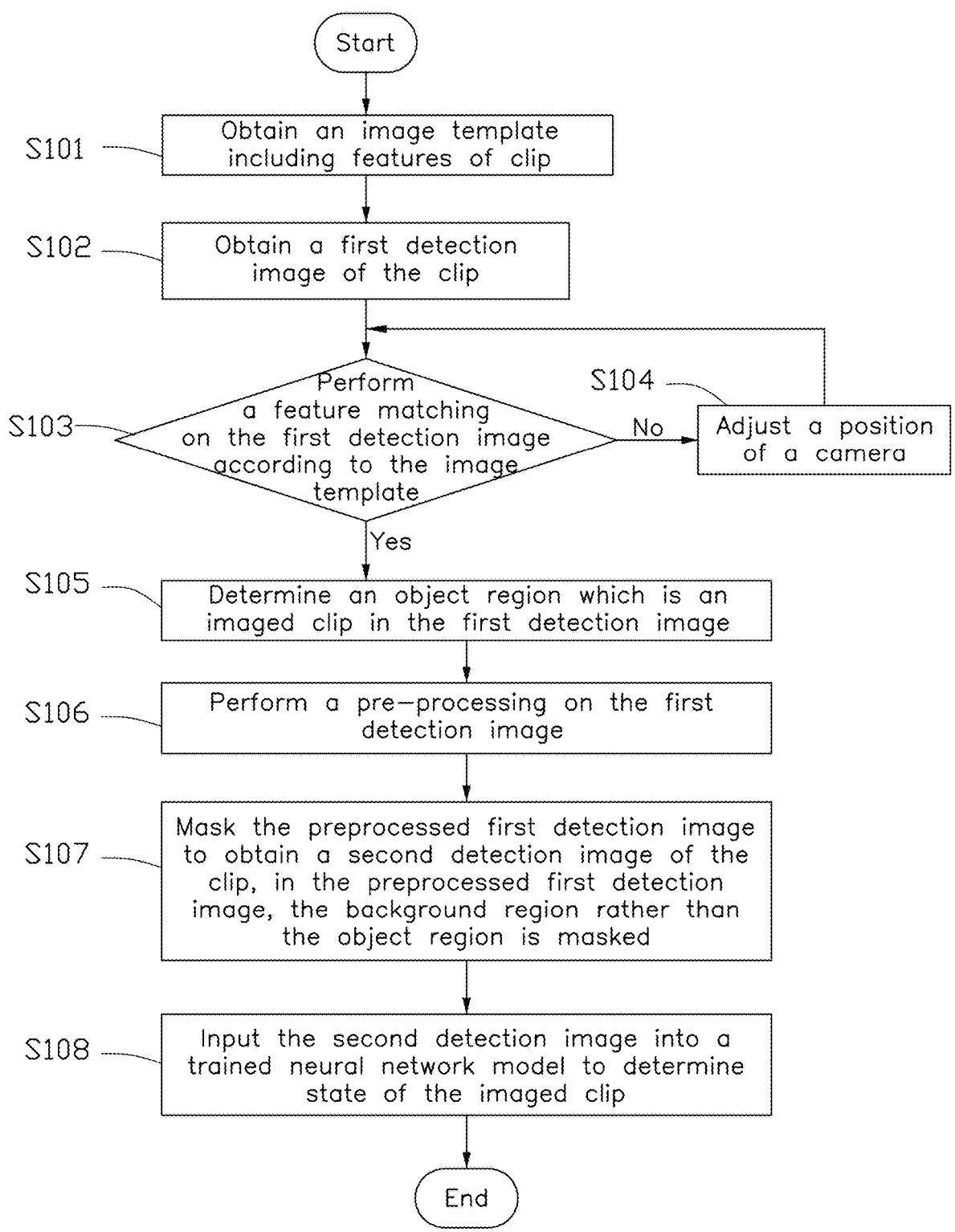
FIG. 4 is a flowchart of a first embodiment of a method for detecting correctness of the state of a clip.

Referring to FIG. 4, a flowchart of a first embodiment of a method for detecting state of an imaged clip is shown. The method can be executed by a processor of the detection device 100. The method can include:

At S101, obtaining an image template including features of clip.

Figure 5:
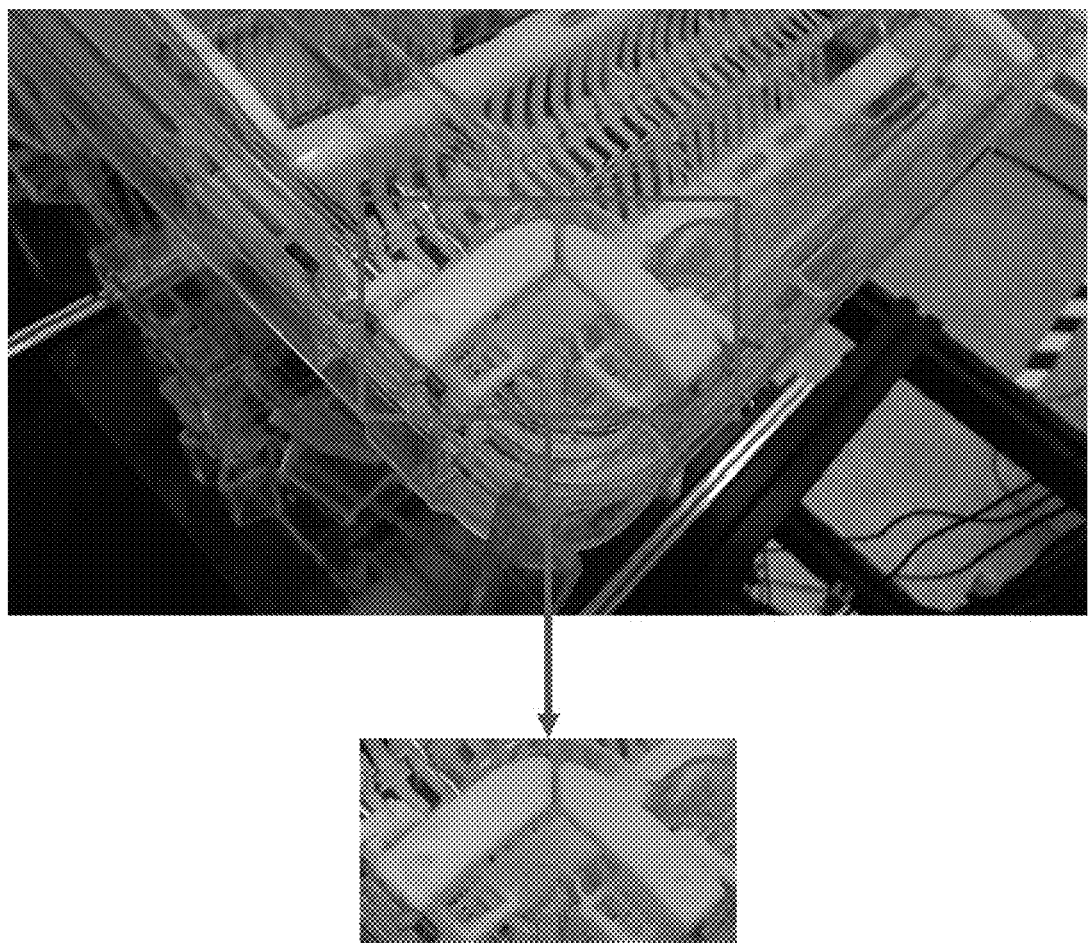
FIG. 5 is a schematic view of another embodiment of a clip.

The processor can control the camera to capture an image of the clip to be used as a standard image. In at least one embodiment, the standard image can be an image of the clip captured by the camera when the camera is newly installed or the camera is newly calibrated. When the camera is newly installed or the camera is newly calibrated, the position of the imaged clip is at the second preset location in the standard image captured by the camera (for example in the center region of the standard image). The processor can obtain the image template from the standard image. In at least one embodiment, the image template can be a part of an image which is the second preset location of the standard image. Thus, the imaged clip can be the main object and main focuses in the image template. For example, in FIG. 5, there is a larger image and a smaller image. The larger image can be the standard image of the clip. In the larger image of the FIG. 5, there is a rectangle marking at the center region of the image. The smaller image of the FIG. 5 can be the part of the image marked by the rectangle marking in the larger image of the FIG. 5, namely, the image template. It can be understood that, the marking can be other shape, for example, circle, or the like; the rectangle marking in the larger image of the FIG. 5 can be configured to mark the part of the image in the rectangle marking as the image template, however, there is no rectangle marking in the real image captured by the camera; the disclosure is not limited.

In at least one embodiment, the processor can be further configured to adjust the position of the camera, to cause the imaged clip to be displayed in the second preset location in the standard image. Thus, the image template can be obtained from the standard image.

At S102, obtaining a first detection image of the clip.

The processor can control the camera to capture the first detection image of the clip.

In at least one embodiment, the processor can control the light source to illuminate the clip when the camera captures the first detection image of the clip.

Figure 6A:
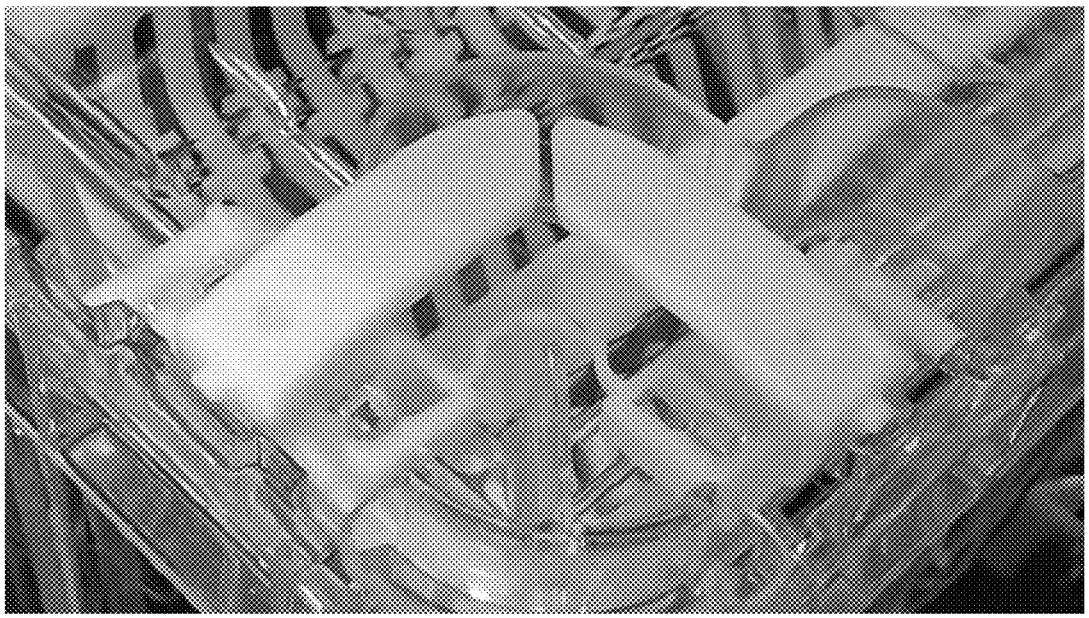
FIGS. 6A-6B are schematic views of other embodiments of clips.
Figure 6B:
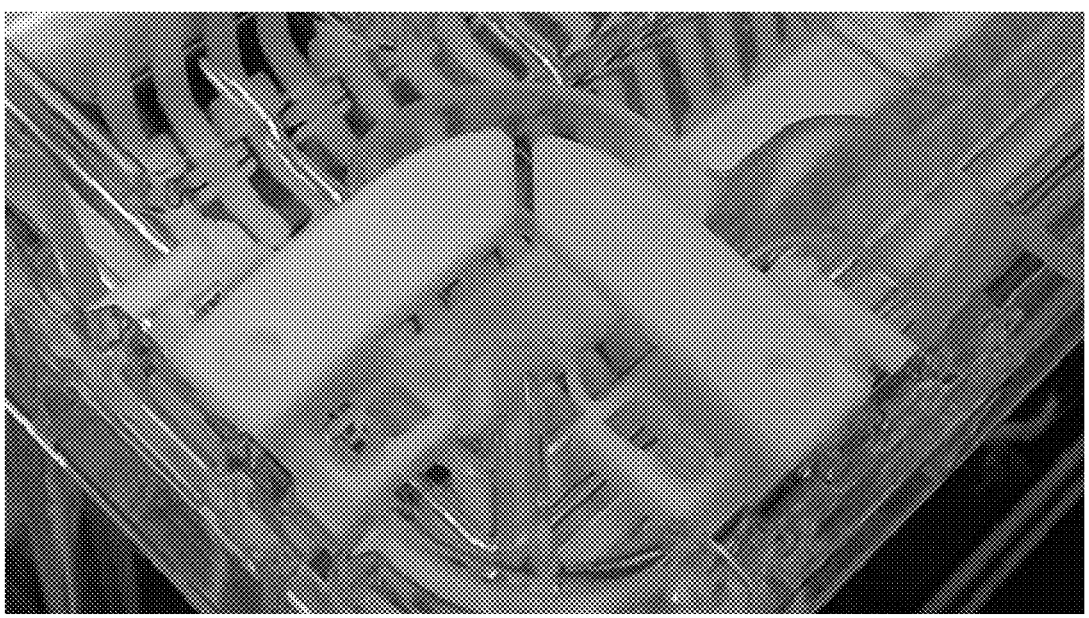

In at least one embodiment, problems such as shadows, uneven brightness, and so on may be apparent in the image before the processor controls the light source to illuminate the clip. For example, as shown in FIG. 6A, the brightness value at two ends of the clip in the first detection image are significantly different. For reducing the shadow and the uneven brightness in the first detection image, the processor can adjust the light strength and the position of the light source and control the light source to illuminate the clip, thus the interference by the ambient light can be reduced. As shown in FIG. 6B, the brightness values at two ends of the clip in the first detection image can be balanced via adjusting the light strength and the position of the light source. FIG. 6A and the FIG. 6B show distinct differences in displaying, before and after the illumination of the light source and only a part of the image captured by the camera is displayed. Thus, the processor can adjust the light strength and the position of the light source to provide a steady interior light, to reduce the interference by the ambient light.

In at least one embodiment, the processor can control the light source to illuminate the clip for the camera to capture the standard image of the clip, the disclosure is not limited herein.

In at least one embodiment, the first detection image can be an image of the clip obtained from another device. The another device can be a computer, a smart phone, a wearable device, another clip detection device, or the like.

At S103, performing a feature matching on the first detection image according to the image template. If the feature matching fails, the procedure goes to a step S104. If the feature matching is successful, the procedure goes to a step S105.

Figure 7A:
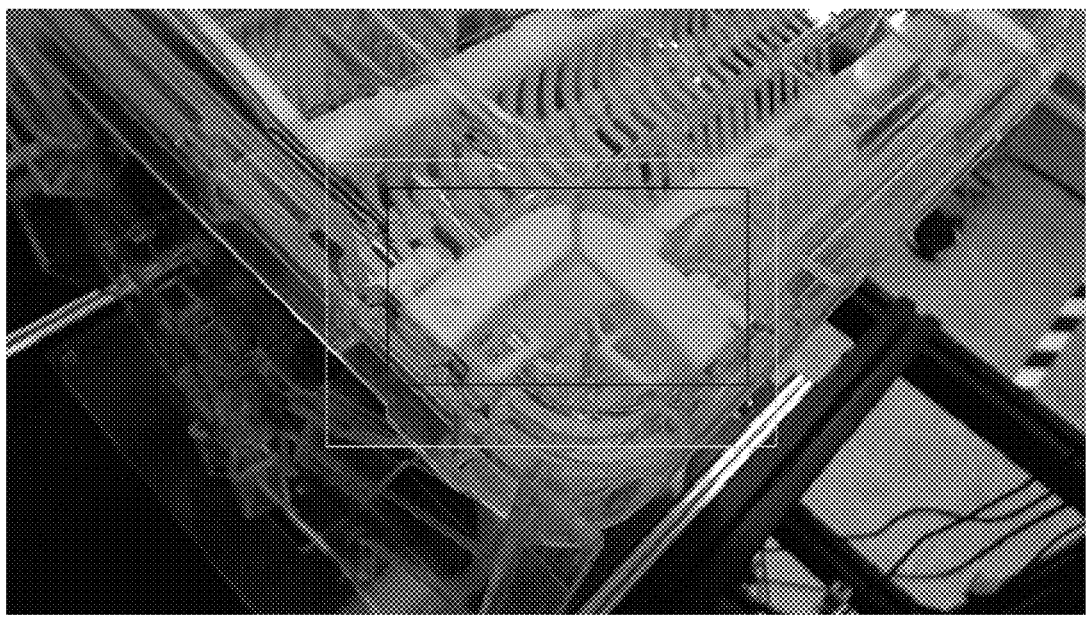
FIGS. 7A-7B are schematic views of other embodiments of clips.
Figure 7B:
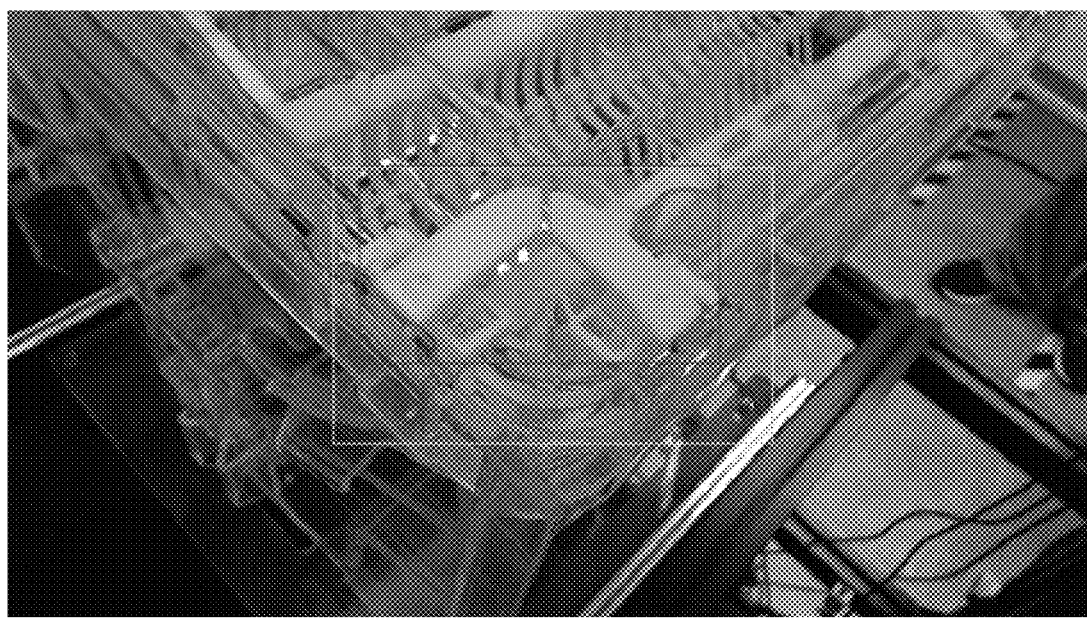

The processor can perform the feature matching on the first detection image, namely determine the position of the imaged clip as being within or not being within the first preset location of the first detection image. In at least one embodiment, if the feature matching is successful, the processor can determine the position of the imaged clip in the first detection image. For example, as shown in FIG. 7A, in the first detection image, the position of the imaged clip marked by a smaller rectangle marking is within the first preset location marked by a larger rectangle marking, thus the feature matching is successful. In at least one embodiment, if the feature matching fails, the processor can determine that the position of the imaged clip in the first detection image is too far away from an optimal position. For example, as shown in FIG. 7B, in the first detection image, the position of the imaged clip marked by a smaller rectangle marking is slightly out of the first preset location marked by a larger rectangle marking, thus the feature matching fails. In at least one embodiment, if the imaged clip is within the first preset location of the first detection image, the feature matching is successful. If the imaged clip is out of the first preset location of the first detection image, the feature matching fails.

In at least one embodiment, a size of the first preset location is greater than a size of the second preset location, and a size of the first preset location is less than the image captured by the camera of the detection device.

At S104, adjusting the position of the camera. Then, the procedure goes to step S102.

In at least one embodiment, the processor can adjust the position of the camera according to the first detection image and the image template according to an operator command.

At S105, determining the object region which is the imaged clip in the first detection image.

In at least embodiment, the object region is the region of the image focusing on the imaged clip.

At S106, performing a pre-processing on the first detection image.

In at least one embodiment, the pre-processing includes, but is not limited to, Histogram Equalization, Histogram Stretching, Laplace Operator, log transformation, Gamma transformation, or the like.

It can be understood that, before performing the pre-processing on the first detection image, the method further includes, selecting a part of the image which is the first preset location of the first detection image, thus the processor performs the pre-processing on the part of the image which is the first preset location in the first detection image.

Figure 8A:
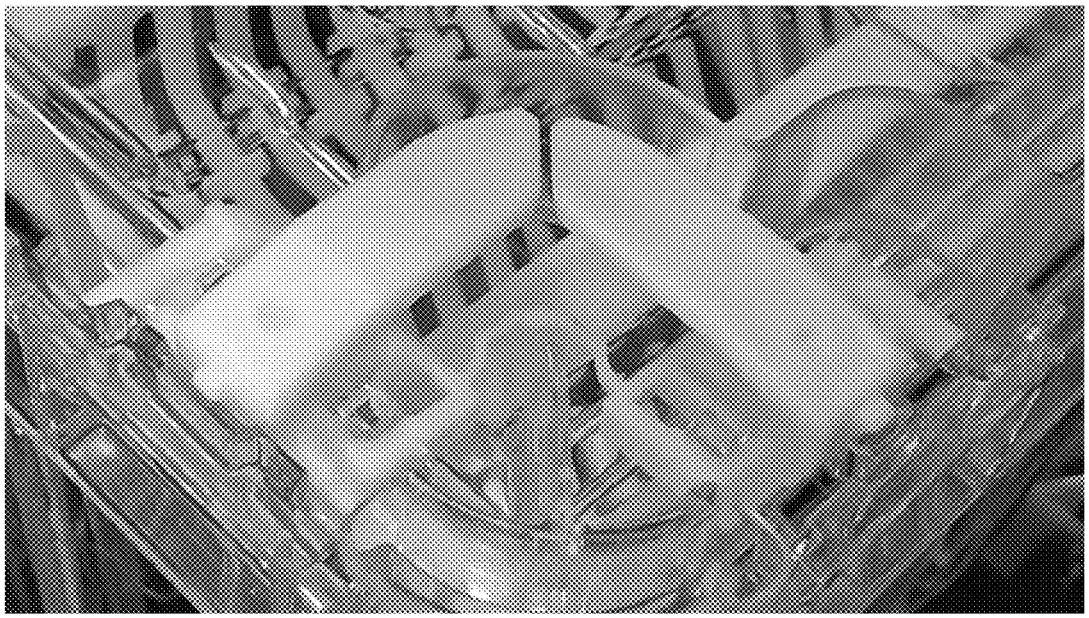
FIGS. 8A-8B are schematic views of other embodiments of clips.
Figure 8B:
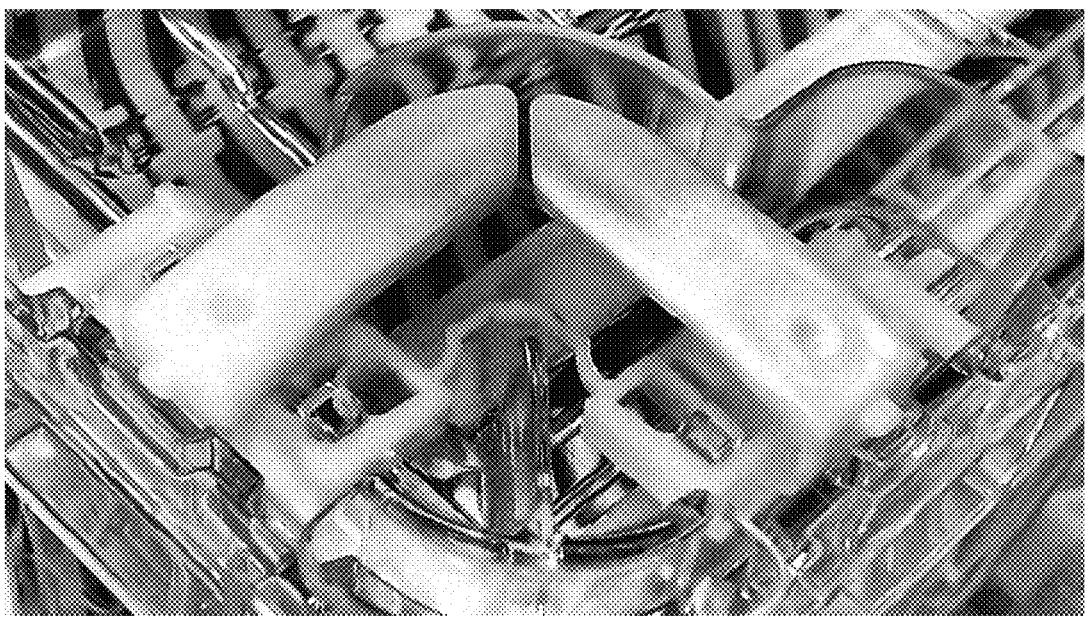

The processor can improve a contrast of the first detection image via pre-processing. Thus, the features of the clip in the first detection image can be made more distinct. For example, before pre-processing, the imaged clip in the first detection image is indistinct, as shown in FIG. 8A. After pre-processing, for example after Histogram Equalization on the first detection image, the contrast of the first detection image can be improved, and the imaged clip in the first detection image is distinct, as shown in FIG. 8B.

At S107, masking the preprocessed first detection image to obtain a second detection image of the clip. In the preprocessed first detection image, the background region rather than the object region is masked.

Figure 9A:
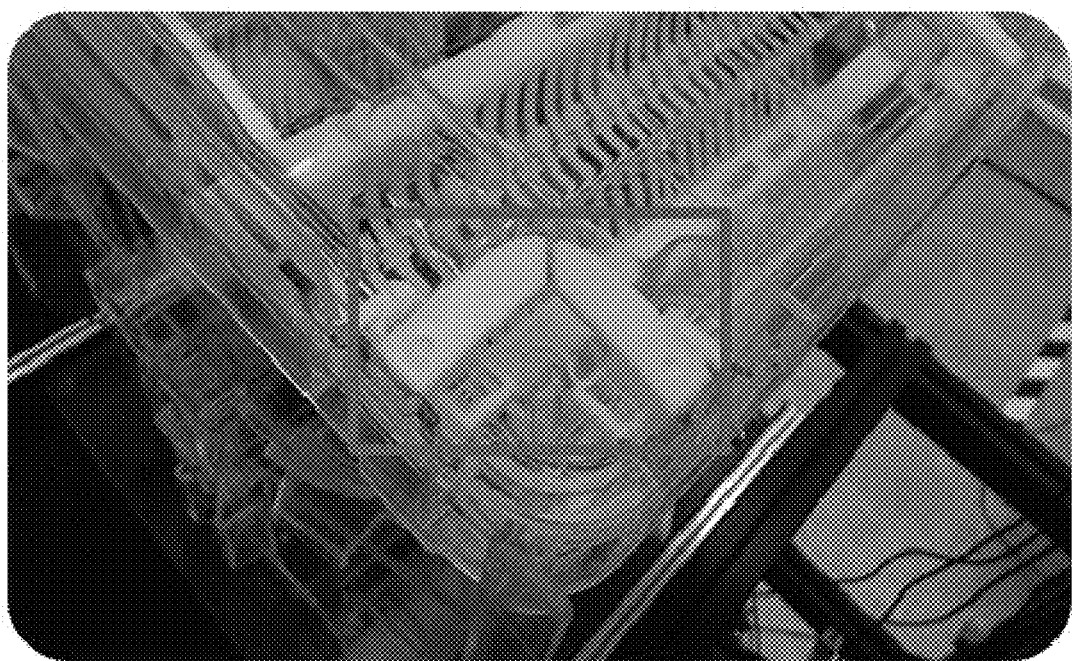
FIGS. 9A-9D are schematic views of other embodiments of clips.
Figure 9B:
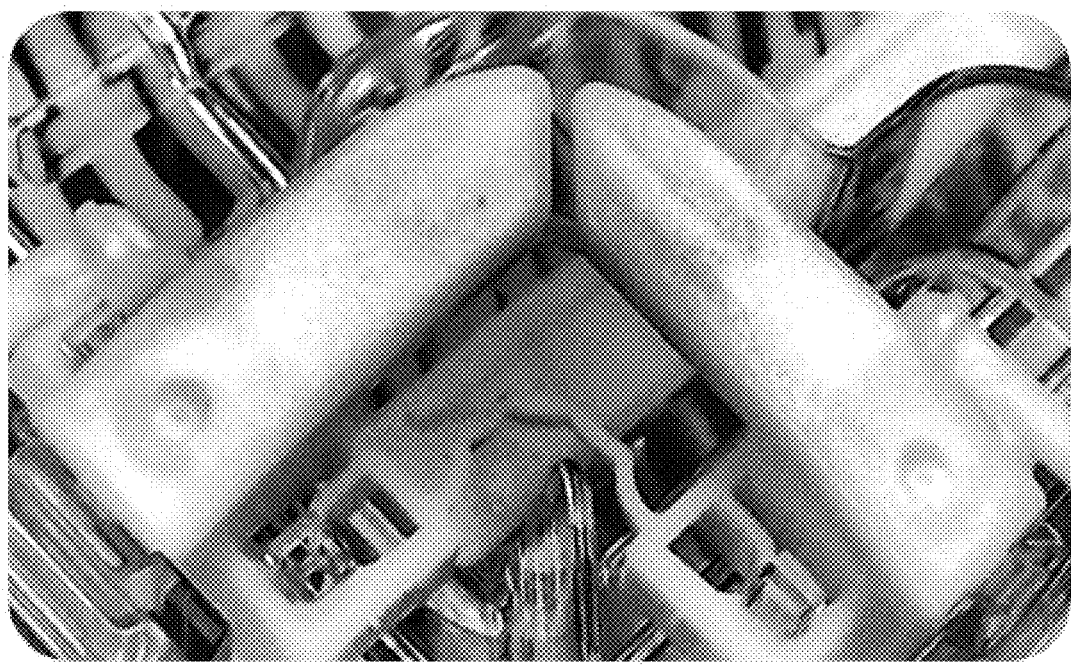
Figure 9C:
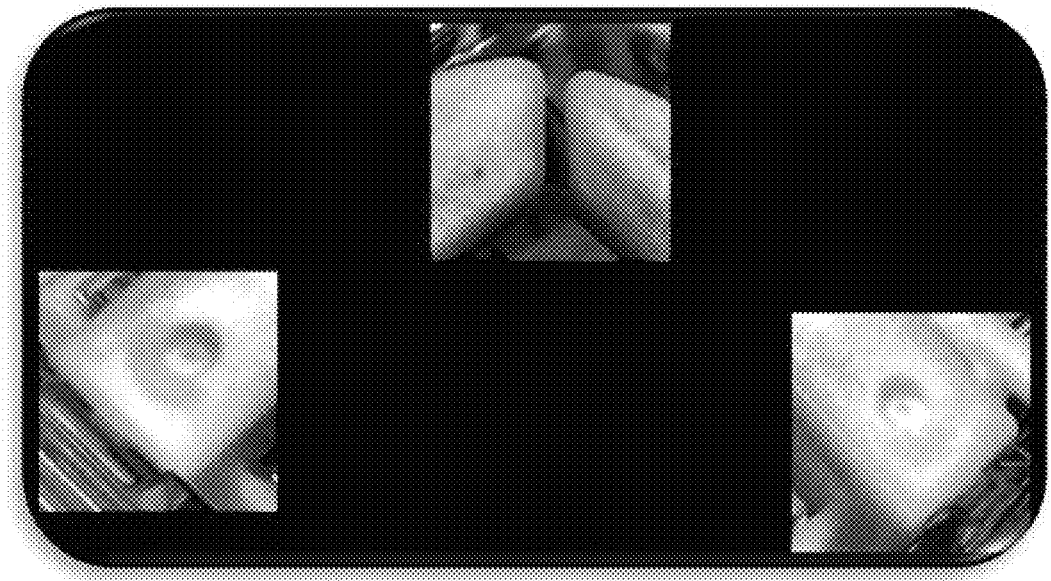
Figure 9D:
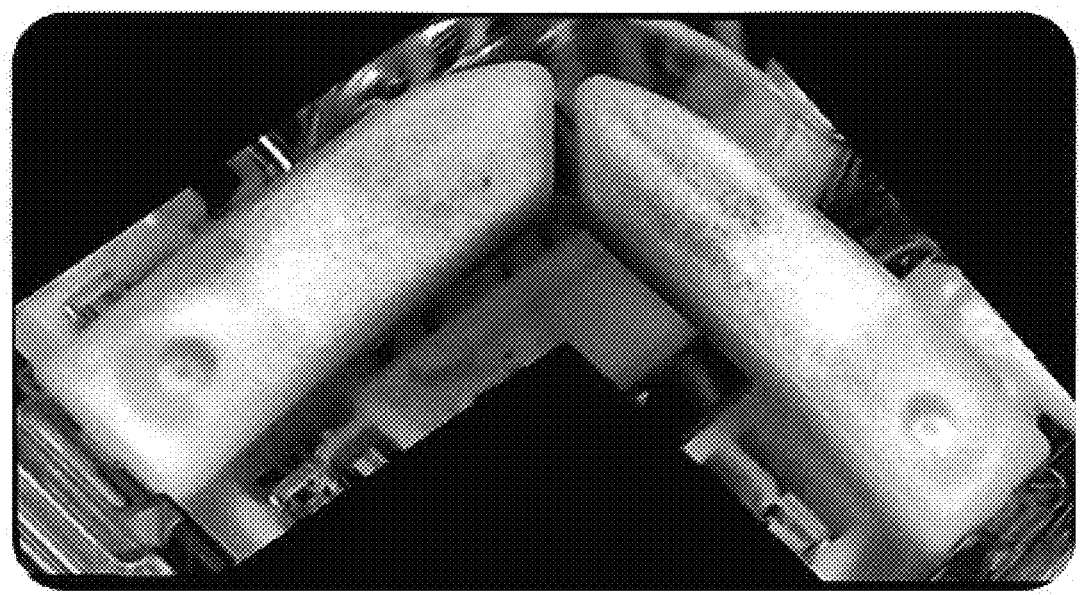

In at least one embodiment, after masking, the background region is obscured, and the object region is displayed. In at least one embodiment, after masking, only a part of the object region is displayed, for example, only the ends and a middle of the object region is displayed. Because the object region which is the imaged clip in the first detection image is determined at step S105, thus the preprocessed image can be masked to only display the object region or the part of the object region. For example, in FIG. 9A, a part of the image marked by the rectangle marking in the first detection image includes the object region of the clip. FIG. 9B shows increased contrast of the part of the image, where the imaged clip in the part of the image is made distinct. FIG. 9C shows that the preprocessed image is masked, where the background region rather than the imaged clip is masked, and a part of imaged clip is displayed. FIG. 9D shows that the preprocessed image is masked, where the background region rather than the imaged clip is masked, and the integrity imaged clip is displayed.

It can be understood that, for different shapes of the clip, different maskings can be set.

At S108, inputting the second detection image into the trained neural network model to determine state of the imaged clip. The trained neural network model is the neural network model which has been trained via inputting training images which are masked into the neural network model. In the training images, the states of the clips include sealed-state and unsealed-state.

In at least one embodiment, the neural network model includes, but is not limited to, Convolutional Neural Networks, Recurrent Neural Network, Long-Short Term Memory, Gated Recurrent Unit, or the like.

In at least one embodiment, the training images can be part of the images which are first preset locations in the images of the clips. In the images of the clips, the feature of the clips are in the first preset locations.

The trained neural network model can efficiently distinguish in the second detection image a sealed-state clip and an unsealed-state clip and output the detection result.

It can be understood that, the controlling of the light source in the step S102 can be omitted, and the step S106 can be omitted, at the moment, the method can select the part of the image which is the first preset location of the first detection image, and mask the part of the image; the disclosure is not limited.

Figure 10A:
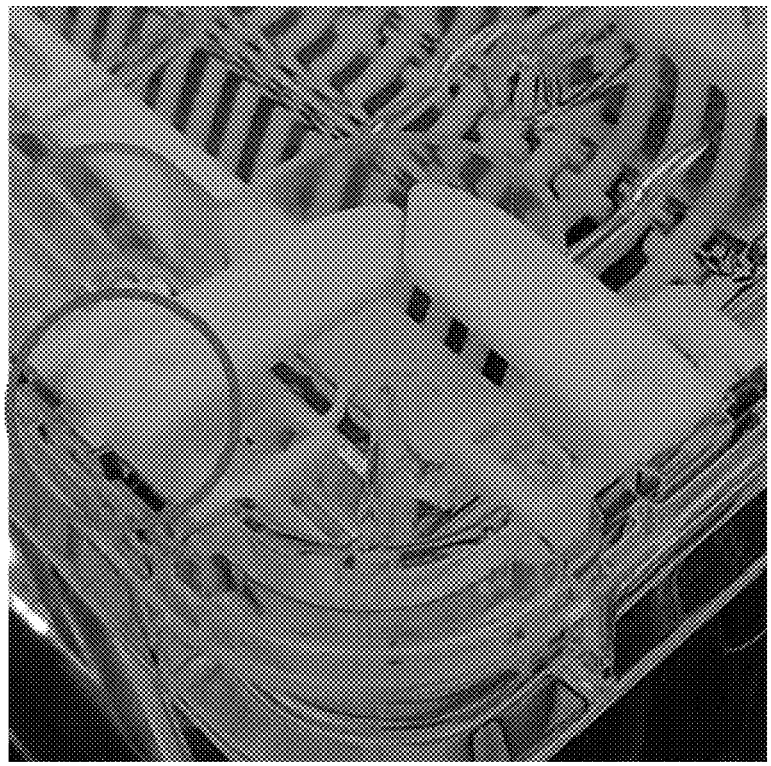
FIGS. 10A-10D are schematic views of other embodiments of clips.
Figure 10B:
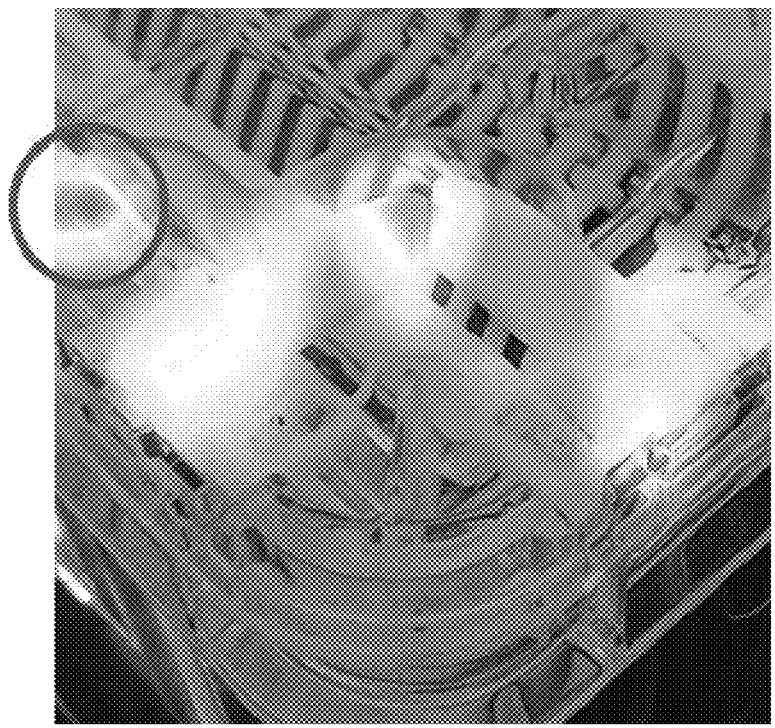
Figure 10C:
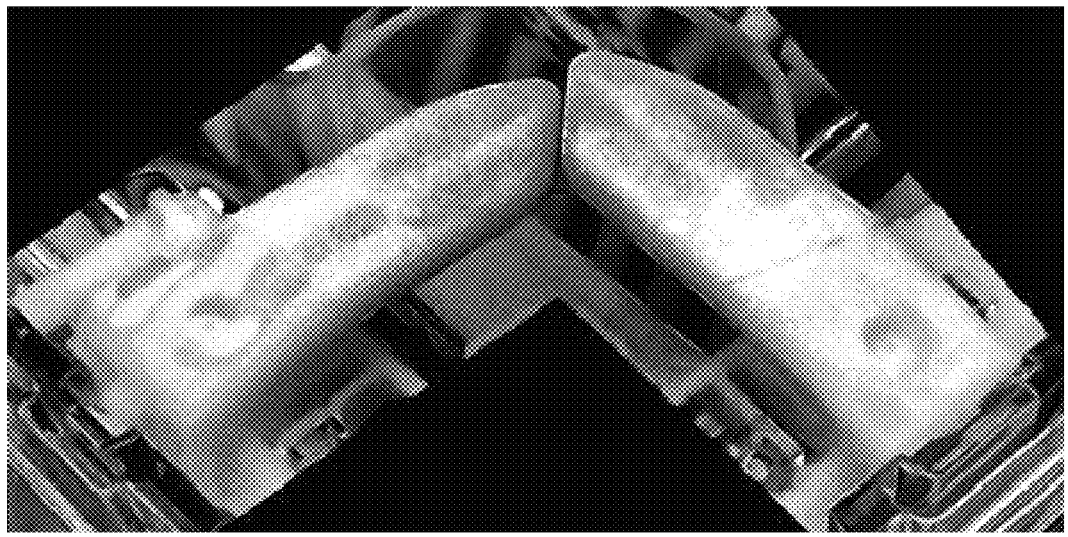
Figure 10D:
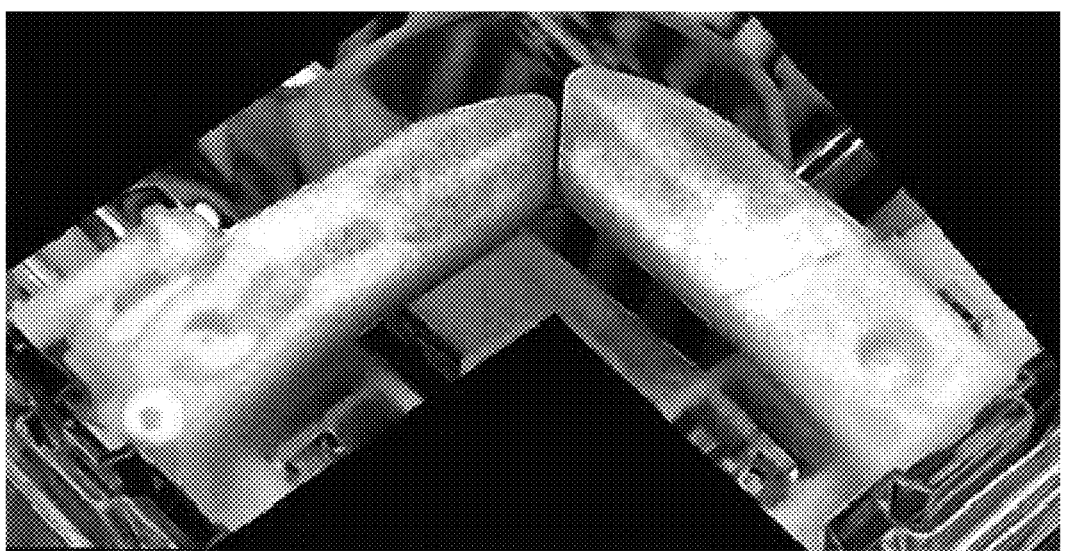

The disclosure can be, for example, during detection, the method employs Gradient-weighted Class Activation Map to explain a classification basis, and generate a class activation heatmap of the second detection image. FIG. 10A shows that the latch of the imaged clip circled by a circle in the image is not in a correct state, namely unsealed. FIG. 10B is an output heatmap after the image shown in the FIG. 10A is inputted into a conventional neural network model. In the FIG. 10B, the imaged clip and the circled background are displayed. The image shows in the FIG. 10A can be masked to be a second detection image as shown in FIG. 10C. FIG. 10D is an output heatmap after the second detection image shown in the FIG. 10C is inputted into the trained neural network model of the instant disclosure. In the FIG. 10D, the background region rather than the imaged clip is filtered out, and only the imaged clip is displayed.

The disclosure can determine a desired region to analyze in the first detection image (for example the imaged clip), and mask the background region rather than the desired region, thus the region needed for identifying correctness of state can actually remain. The quantity of pixels of the second detection image inputted into the trained neural network model can be reduced, thus the number of the parameters of the neural network model can be reduced, and the interference of the background region can be reduced, the detection speed and the detection accuracy can be accordingly improved.

Figure 11:
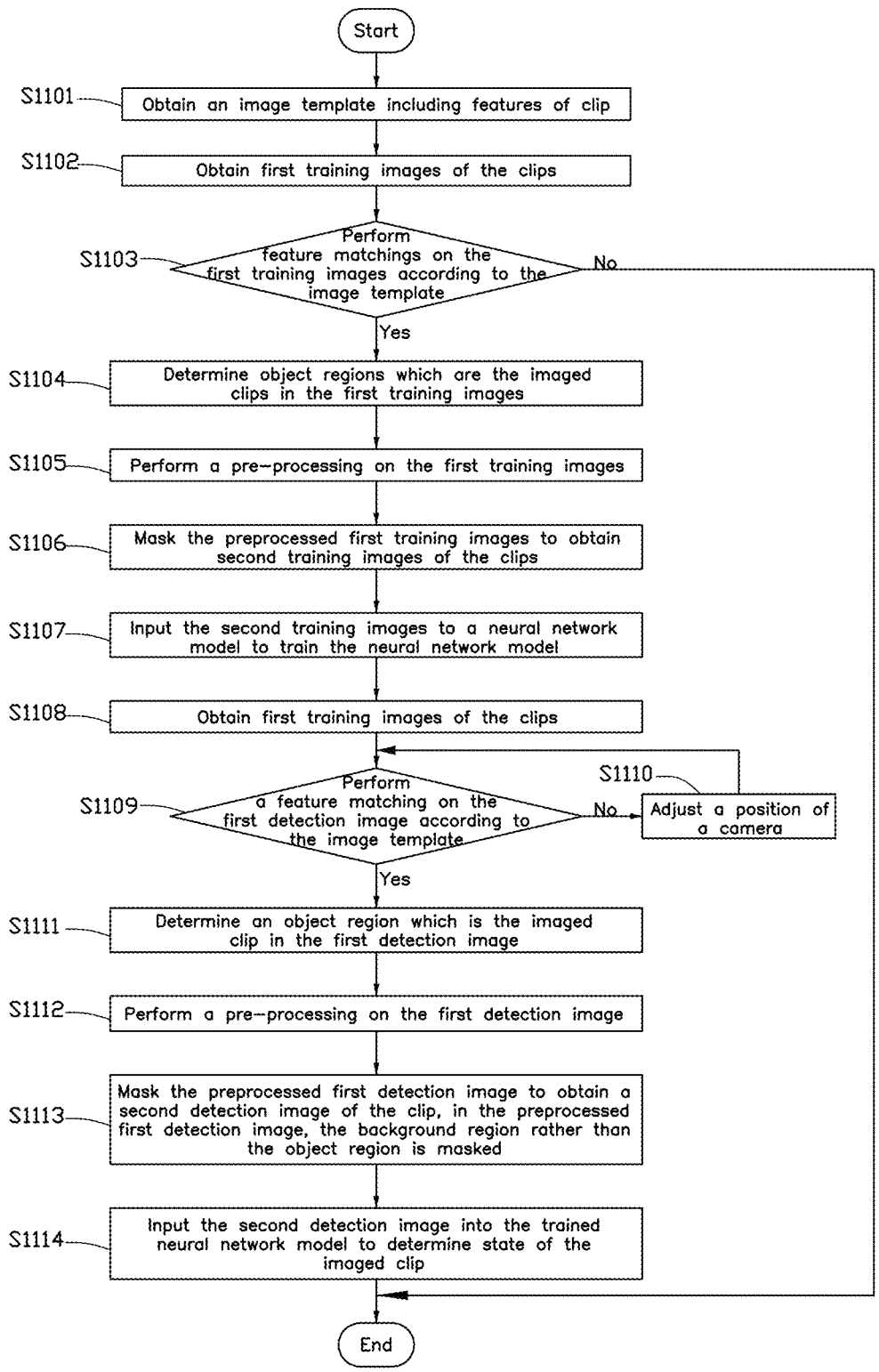
FIG. 11 is a flowchart of a second embodiment of a method for detecting correctness of the state of a clip.

Referring to FIG. 11, FIG. 11 is a flowchart of a second embodiment of a method for detecting state of an imaged clip. The method can be executed by a processor of the detection device. The method can include:

At S1101, obtaining an image template including features of clip.

The step S1101 of the second embodiment is the same as the step S101 of the first embodiment, the detail can refer to the related description of the step S101 of the first embodiment in the FIG. 4, which will not be described herein.

At S1102, obtaining first training images of the clips. In the first training images, the states of the clips include sealed-state and unsealed-state.

In at least one embodiment, the first training images can be images of different clips newly captured by the camera during detecting the clip. In at least one embodiment, the first training images can be images captured during detecting the other different clips before detecting the instant clip. In at least one embodiment, the first training images can be obtained from the another device, the another device can be a computer, a smart phone, a wearable device, another clip detection device, or the like.

In at least one embodiment, the processor can control the light source to illuminate the clips when the camera captures the first training images of the clips.

The process of controlling the light source to illuminate the clips, can refer to the process of controlling the light source to illuminate the clip in the first embodiment of the FIG. 4, and details are not described herein again.

At S1103, performing feature matchings on the first training images according to the image template. If the feature matching fails, the procedure goes to end. If the feature matching is successful, the procedure goes to a step S1104.

The process of performing feature matchings on the first training images according to the image template, can refer to the process of performing feature matchings on the first detection image according to the image template in the first embodiment of the FIG. 4, and details are not described herein again.

Therefore, some images of the first training images in which the positions of the imaged clips are distanced can be filtered out, and some images of the first training images in which the positions of the clips are in the first preset location can be remained.

At S1104, determining the object regions which are the imaged clips in the first training images.

In at least embodiment, the object regions are the regions of the images focusing on the imaged clips.

At S1105, performing a pre-processing on the first training images.

The process of performing the pre-processing on the first training images, can refer to the process of performing the pre-processing on the first detection image in the first embodiment of the FIG. 4, and details are not described herein again.

At S1106, masking the preprocessed first training images to obtain second training images of the clips. Where, in the preprocessed first training images, the background regions rather than the object regions are masked.

The process of masking the preprocessed first training images to obtain second training images of the clips, can refer to the process of masking the preprocessed first detection image to obtain the second detection image of the clip in the first embodiment of the FIG. 4, and details are not described herein again.

At S1107, inputting the second training images to the neural network model to train the neural network model.

The processor can employ the second training images to train the neural network model. The interference by the background regions rather than the imaged clips in the second training images can be reduced. Thus, the quantity of pixels of the second training images inputted into the neural network model can be reduced, the number of parameters of the neural network model can be accordingly reduced, and the number of the second training images used to train can be reduced, therefore the training speed can be improved.

For example, in a conventional training method, during training, the number of the training images used to train the neural network model is 5800, and the number of the parameters of the neural network model is 1,924,737. In the instant disclosure, during training, the number of the training images used to train the neural network model is 3500, and the number of the parameters of the neural network model is 36,721. Thus, in the instant disclosure, the number of the images inputted into the neural network model can be reduced via employing the second training images to train the neural network model, the number of parameters of the neural network model needed to be trained can be reduced, thereby, the training cost of the neural network model can be lower.

In at least one embodiment, if the first training images are images of different clips newly captured by the camera during detecting, the processor can control the light source to illuminate the clips. In at least one embodiment, the processor can adjust the light strength and the position of the light source, thus an abundant training sample can be provided. The trained neural network model can be accordingly adapted for a more widely illumination environment.

At S1108, obtaining a first detection image of the clip.

The step S1108 of the second embodiment is the same as the step S102 of the first embodiment, the detail can refer to the related description of the step S102 of the first embodiment in the FIG. 4, which will not be described herein.

At S1109, performing a feature matching on the first detection image according to the image template. If the feature matching fails, the procedure goes to a step S1110. If the feature matching is successful, the procedure goes to a step S1111.

The step S1109 of the second embodiment is the same as the step S103 of the first embodiment, the detail can refer to the related description of the step S103 of the first embodiment in the FIG. 4, which will not be described herein.

At S1110, adjusting the position of the camera. Then, the procedure goes to step S1108.

The step S1110 of the second embodiment is the same as the step S104 of the first embodiment, the detail can refer to the related description of the step S104 of the first embodiment in the FIG. 4, which will not be described herein.

At S1111, determining the object region which is the imaged clip in the first detection image.

The step S1111 of the second embodiment is the same as the step S105 of the first embodiment, the detail can refer to the related description of the step S105 of the first embodiment in the FIG. 4, which will not be described herein.

At S1112, performing a pre-processing on the first detection image.

The step S1112 of the second embodiment is the same as the step S106 of the first embodiment, the detail can refer to the related description of the step S106 of the first embodiment in the FIG. 4, which will not be described herein.

At S1113, masking the preprocessed first detection image to obtain a second detection image of the clip. In the preprocessed first detection image, the background region rather than the object region is masked.

The step S1113 of the second embodiment is the same as the step S107 of the first embodiment, the detail can refer to the related description of the step S107 of the first embodiment in the FIG. 4, which will not be described herein.

At S1114, inputting the second detection image into the trained neural network model to determine state of the imaged clip. The trained neural network model is the neural network model which has been trained via inputting training images which are masked into the neural network model. In the training images, the states of the clips include sealed-state and unsealed-state.

The step S1114 of the second embodiment is the same as the step S108 of the first embodiment, the detail can refer to the related description of the step S108 of the first embodiment in the FIG. 4, which will not be described herein.

The disclosure further provide a storage medium configured to store one or more programs. The processor can execute the one or more programs to accomplish the steps of the exemplary method.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for detecting state of clip applied on a device for detecting state of clip, the method comprising:
    obtaining an image template comprising features of the clip;
    obtaining a first detection image of the clip;
    determining an object region which is the imaged clip in the first detection image according to the image template;
    selecting a part of image which is a first preset location of the first detection image, wherein the imaged clip is distributed in the part of the image;
    masking the part of the image to obtain a second detection image of the clip, wherein masking is obscuring a background region in the part of the image rather than the object region, and displaying the object region unobscured;
    inputting the second detection image of the clip into a trained neural network model to determine whether the state of the clip is sealed-state; wherein the trained neural network model is the neural network model which has been trained via inputting training images which are masked into the neural network model, in the training images, the states of the clip comprise sealed-state and unsealed-state.

2. The method according to claim 1, wherein the obtaining an image template comprising features of the clip comprises:
    obtaining a standard image of the clip; wherein the imaged clip is located in a second preset location in the standard image; a size of the second preset location is smaller than a size of the first preset location;
    selecting the second preset location of the standard image to be the image template.

3. The method according to claim 1, wherein the determining an object region which is the imaged clip in the first detection image according to the image template comprises:
    performing a feature matching on the first detection image according to the image template; and
    determining the object region which is the imaged clip in the first detection image if the feature matching is successful; wherein the feature matching is successful if a position of the imaged clip is within the first preset location of the first detection image.

4. The method according to claim 3, wherein the method further comprises:
    adjusting a position of a camera of the device for detecting state of clip if the feature matching fails; wherein the feature matching fails if the position of the imaged clip is out of the first preset location of the first detection image;
    controlling the camera to capture another first detection image until the feature matching is successful.

5. The method according to claim 1, wherein before masking the part of the image to obtain a second detection image of the clip, the method further comprises:
    pre-processing the part of the image to improve a contrast of the part of the image, wherein the pre-processing comprises at least one from a group consisting of: Histogram Equalization, Histogram Stretching, Laplace Operator, log transformation, Gamma transformation.

6. The method according to claim 1, wherein before masking the part of the image to obtain a second detection image of the clip, the method further comprises:
    controlling a light strength and a position of a light source of the device for detecting the state of clip to reduce interference by ambient light.

7. The method according to claim 1, wherein images in which the position of the imaged clip is out of the first preset location of the images are filtered out from the training images.

8. A device for detecting state of clip comprising:
    a storage device;
    at least one processor; and
    the storage device storing one or more programs, which when executed by the at least one processor, cause the at least one processor to:
    obtain an image template comprising features of the clip;
    obtain a first detection image of the clip;
    determine an object region which is the imaged clip in the first detection image according to the image template;
    select a part of image which is a first preset location of the first detection image, wherein the imaged clip is distributed in the part of the image;
    mask the part of the image to obtain a second detection image of the clip, wherein masking is obscuring a background region in the part of the image rather than the object region, and displaying the object region unobscured;
    input the second detection image of the clip into a trained neural network model to determine whether the state of the clip is sealed-state; wherein the trained neural network model is the neural network model which has been trained via inputting training images which are masked into the neural network model, in the training images, the states of the clip comprise sealed-state and unsealed-state.

9. The electronic device according to claim 8, further causing the at least one processor to:
    obtain a standard image of the clip; wherein the imaged clip is located in a second preset location in the standard image; a size of the second preset location is smaller than a size of the first preset location;
    select the second preset location of the standard image to be the image template.

10. The electronic device according to claim 8, further causing the at least one processor to:
    perform a feature matching on the first detection image according to the image template; and
    determine the object region which is the clip in the first detection image if the feature matching is successful; wherein the feature matching is successful if a position of the imaged clip is within the first preset location of the first detection image.

11. The electronic device according to claim 10, further causing the at least one processor to:

adjust a position of a camera of the device for detecting state of clip if the feature matching fails; wherein the feature matching fails if the position of the imaged clip is out of the first preset location of the first detection image;

control the camera to capture another first detection image until the feature matching is successful.

12. The electronic device according to claim 8, further causing the at least one processor to:

pre-process the part of the image to improve a contrast of the part of the image, wherein the pre-processing comprises at least one from a group consisting of: Histogram Equalization, Histogram Stretching, Laplace Operator, log transformation, Gamma transformation.

13. The electronic device according to claim 8, further causing the at least one processor to:

control a light strength and a position of a light source of the device for detecting the state of clip to reduce interference by ambient light.

14. The electronic device according to claim 8, wherein images in which the position of the imaged clip is out of the first preset location of the images are filtered out from the training images.

15. A non-transitory storage medium storing a set of commands, when the commands being executed by at least one processor of an electronic device, causing the at least one processor to:

obtain an image template comprising features of clip;

obtain a first detection image of the clip;

determine an object region which is the imaged clip in the first detection image according to the image template;

select a part of image which is a first preset location of the first detection image, wherein the clip is distributed in the part of the image;

mask the part of the image to obtain a second detection image of the clip, wherein masking is obscuring a background region in the part of the image rather than the object region, and displaying the object region unobscured;

input the second detection image of the clip into a trained neural network model to determine whether the state of the clip is sealed-state; wherein the trained neural network model is the neural network model which has been trained via inputting training images which are masked into the neural network model, in the training images, the states of the clip comprise sealed-state and unsealed-state.

16. The non-transitory storage medium according to claim 15, further causing the at least one processor to:

obtain a standard image of the clip; wherein the imaged clip is located in a second preset location in the standard image; a size of the second preset location is smaller than a size of the first preset location;

select the second preset location of the standard image to be the image template.

17. The non-transitory storage medium according to claim 15, further causing the at least one processor to:

perform a feature matching on the first detection image according to the image template; and determine the object region which is the clip in the first detection image if the feature matching is successful; wherein the feature matching is successful if a position of the imaged clip is within the first preset location of the first detection image.

18. The non-transitory storage medium according to claim 17, further causing the at least one processor to:

adjust a position of a camera of the device for detecting state of clip if the feature matching fails; wherein the feature matching fails if the position of the imaged clip is out of the first preset location of the first detection image;

control the camera to capture another first detection image until the feature matching is successful.

19. The non-transitory storage medium according to claim 15, further causing the at least one processor to:

pre-process the part of the image to improve a contrast of the part of the image, wherein the pre-processing comprises at least one from a group consisting of: Histogram Equalization, Histogram Stretching, Laplace Operator, log transformation, Gamma transformation.

20. The non-transitory storage medium according to claim 15, further causing the at least one processor to:

control a light strength and a position of a light source of the device for detecting the state of clip to reduce interference by ambient light.

* * * * *